United States Patent [19]

Young et al.

[11] 4,028,707
[45] June 7, 1977

[54] ANTENNA FOR UNDERGROUND PIPE DETECTOR

[75] Inventors: Jonathan D. Young, Worthington; Ross Caldecott, Columbus, both of Ohio

[73] Assignee: The Ohio State University, Columbus, Ohio

[22] Filed: Mar. 11, 1976

[21] Appl. No.: 665,924

Related U.S. Application Data

[63] Continuation-in-part of Ser. No. 437,927, Jan. 30, 1974, Pat. No. 3,967,282.

[52] U.S. Cl. .............................. 343/719; 343/802; 343/803; 343/873
[51] Int. Cl.² .................... H01Q 1/04; H01Q 21/26
[58] Field of Search .......... 343/719, 803, 804, 797, 343/5 NA, 802, 873

[56] References Cited

UNITED STATES PATENTS

| | | | |
|---|---|---|---|
| 2,285,669 | 6/1942 | Lehman | 343/740 |
| 2,887,682 | 5/1959 | Charman et al. | 343/797 |

*Primary Examiner*—Eli Lieberman
*Attorney, Agent, or Firm*—Sidney W. Millard

[57] ABSTRACT

An apparatus and method wherein an electrial impulse source transmits a radar-type signal through an antenna into the ground and is reflected by a target. The reflected signal or echo is detected by the antenna and an analog-to-digital converter converts it to a digital form which may be readily operated on, stored and recalled. A memory stores the information until recalled for comparison with a subsequent signal to give an indication of the location of metallic and non-metallic buried targets.

14 Claims, 15 Drawing Figures

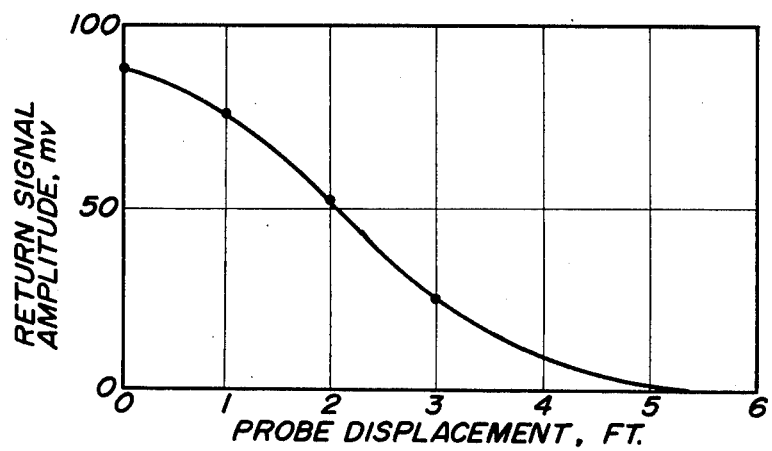
FIG. 4
FIG. 5
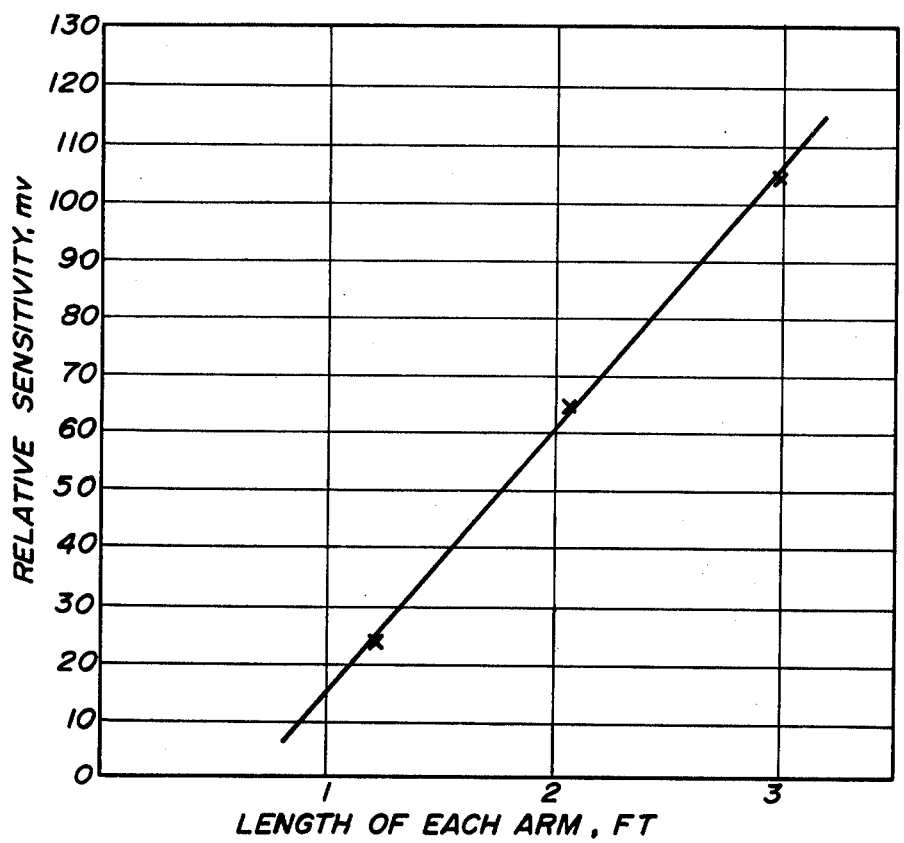

LED DISPLAY OF SINE WAVE

ANTENNA FOR UNDERGROUND PIPE DETECTOR

BACKGROUND OF THE INVENTION

This application is a continuation in part of our co-pending application, Ser. No. 437,927 filed Jan. 30, 1974, now U.S. Pat. No. 3,967,282.

This invention relates to a detector for both metallic and non-metallic buried objects. Previously, metallic underground pipes were used almost exclusively in the transportation of natural gas. Location of the buried metallic pipes was relatively simple since metal reflects high frequency electromagnetic waves which can be easily detected. However, underground metal pipes have inherent problems. They are subject to corrosion to differing degrees, difficult to install and are becoming more difficult and expensive to buy. As a result of these limitations, other types of pipe have become popular. Polymeric pipe being virtually non-corrosive, light, easily installed and relatively inexpensive is rapidly replacing metallic pipe.

A problem with polymeric pipe is that an underground installation cannot be located with conventional metal detectors. As a result, subsurface detectors of non-metallic and metallic objects have evolved. An example of these are shown by U.S. Pat. Nos.:

| Patent No. | Patentee | Dated |
| --- | --- | --- |
| 2,902,688 | W. M. Barret | 8/25/59 |
| 2,901,689 | W. M. Barret et al. | 8/25/59 |
| 2,999,979 | H. J. Woll | 9/12/61 |
| 3,351,936 | A. M. Fedor | 11/07/67 |
| 3,392,384 | L. Wesch | 7/09/68 |
| 3,629,813 | H. Drenkelfort | 12/21/71 |
| 3,728,026 | E. Idestrom et al. | 4/17/73 |

Most of them operate by emitting a radar-like signal, reflecting if off of a target, receiving the reflected wave, operating on it and viewing it. The target reflects the waves differently than its environment because of its different dielectric constant. The surface of the ground, minerals and other items have different dielectric constants and produce signals which may give deceptive information. Water content, in particular, varies the dielectric constant substantially and makes consistent detection of targets difficult at best.

Some of the above-noted patents have tried to compensate for the ground effect in different ways. For example, the Wesch U.S. Pat. No. 3,392,384 utilizes a dual antenna system in an attempt to eliminate the effect of variations in the surrounding environment's dielectric constants. The Wesch device uses a signal transmitting device and two spaced antenna receiving systems, one over the target and one over the surrounding environment. The signals from the two receiving antennas are compared in an attempt to isolate the signal from the target. An inherent problem in this system is the critical nature of the dual antennas. If they should, for any reason, become different in their reception characteristics or if their spacing is not correct, accurate detection of a target will be severely hampered.

This invention substantially solves the problem of compensation for variations in the dielectric constant without resorting to a dual antenna system with its accompanying limitations. The use of less equipment permitted the design of this portable unit which is capable of transportation and operations by a single operator. This invention utilizes a single antenna having a transmitting and receiving section and, thus, avoids any problem of matching or spacing antennas. Compensation for different dielectric constants is accomplished by sampling the dielectric constant near the target area and comparing the resultant signal with that received from the target area. The compensation is handled electronically by operating on and storing a first signal in order that it can be recalled for comparison with a second signal received from the target. It is very important that the signals are converted to a digital form in order to facilitate their storage and comparison in a machine which can be easily transported to and used in the field by a single operator. The equipment necessary to operate on an analog signal in a similar manner would be of such magnitude as to be unuseable in the field.

SUMMARY OF THE INVENTION

An apparatus for detecting underground targets having a dielectric constant different from its environment includes means for transmitting signals to a target. Means for detecting the reflected signals from the target, means for converting the reflected signals and means for operating on the reflected signals are interconnected in order to give an indication of the location and identity of the target.

A method for detecting a target surrounded by an environment having a different dielectric constant includes transmitting a first signal into the environment which reflects at least part of the first signal, detecting the signal, processing it to a form in which it can be readily operated and storing it. A second signal is transmitted, processed, and operated on in conjunction with the first stored signal to give an indication of the target.

A particular aspect and object of the invention resides in the provision of an antenna incorporating separate transmitting and receiving components mutually orthoganally oriented. When operated in accordance with the invention, these components provide for desirable mutually isolated operation and evidence an advantageous immunity to the effects otherwise encountered from planar discontinuities extant beneath the ground.

BRIEF DESCRIPTION OF THE DRAWINGS

FIG. 4 is a graphical representation of antenna sensitivity versus lateral displacement from the target;

FIG. 5 is a graphical representation of the antenna sensitivity in relation to the length of the arms;

DETAILED DESCRIPTION OF THE DRAWINGS

I. General System

Figure 1:
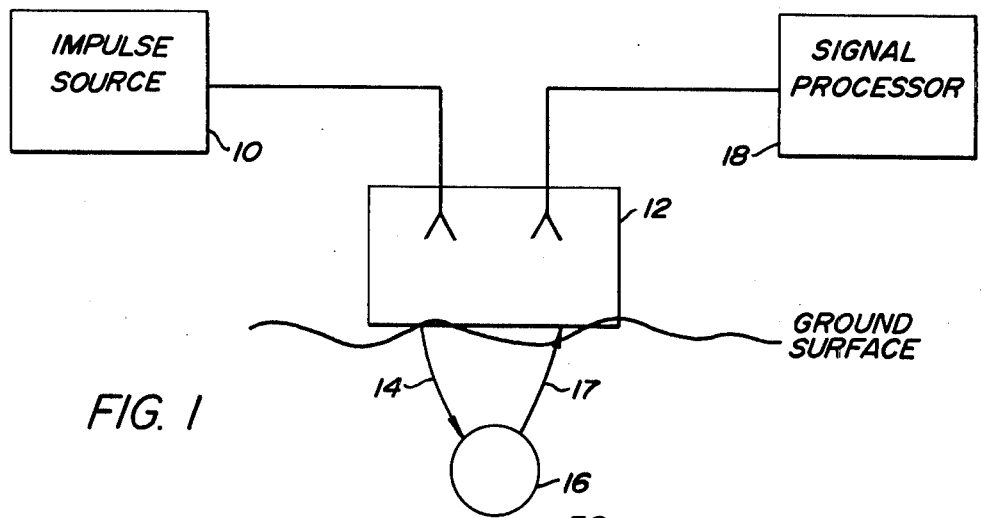
FIG. 1 is a schematic representation of the underground pipe detector.

The basic operation of an underground impulse radar can be explained with the help of the block diagram in FIG. 1. A means for generating signals from the target includes an impulse source 10 (IKOR Model R100 or other adequate source) which typically produces a very short video pulse of approximately $150 \times 10^{-12}$ sec duration and 1000 v peak amplitude although some variation is permitted. This pulse duration is much shorter than conventional radar practice. Furthermore, where a normal radar has 1% bandwidth about its carrier frequency, a carrier frequency cannot be defined for this video pulse, whose output spectrum is spread from 250 Hz (its pulse repetition rate) to beyond 5 GHz.

The transducer probe 12 radiates the impulsive energy into the ground and receives any echoes. The spectrum of the radiated signal lies between about 1 MHz and 300 MHz for probes now in use. At these frequencies, the undisturbed ground acts as a lossy, homogeneous dielectric, and the impulsive electromagnetic wavefront propagates with little distortion. When the transmitted energy encounters any abrupt constitutive parameter changes, an echo is produced. A dielectric constant change (such as a plastic pipe), a conductivity change (such as a metal pipe) or a permeability change (such as an iron ore pocket) can all produce such an echo. For most targets of interest, the incident wavefront excites some resonant scattering modes and the echo has a characteristic time domain shape or signature. Target identification based on time domain signatures has been performed on free space targets, and some characterstic features of underground objects have also been observed. Target return echoes are received by the probe after a time delay proportional to round-trip distance or target depth. Because of the very short pulse duration, depth resolution significantly better than 1 ft. can be achieved by a system of this type. The strength of the return depends on depth and also on the target position with respect to the probe and the directional radiation properties of the probe. These antenna-directional characteristics are used to determine the location of the target. Antennas have been developed which indicate that they are directly over the target with accuracies of plus or minus 1 ft.

The signal 14 is reflected by a target 16. The transducer probe 12 which includes the antenna detects a reflected signal 17 and transmits it to a processor 18.

II. IMPULSE SOURCE

In general, the attenuation rate of signals traveling underground is quite high, due largely to the presence of moisture. As a result, it was found necessary to employ a relatively high power pulse source in order to have an adequate signal-to-noise ratio in the receiving system. The impulse source pulse generator selected was a Model R100 IMP Generator manufactured by Ikor Incorporated, although other sources could be used. This unit generates a pulse of about 1 KV amplitude and about 150 picoseconds in length at a repetition rate of 250 Hz. It consists essentially of a capacitor, charged by a circuit similar to a radar modulator at a repetition rate of 250 Hz, and a gas breakdown tube. When the voltage on the capacitor reaches the breakdown point of the gas tube, the latter conducts and a pulse is generated.

Since the exact time of the pulse depends on the moment of breakdown of the gas tube, no pre-trigger is available. A trigger for the display circuits must, therefore, be obtained from the output pulse itself and sufficient delay included in the received signal line to allow the display circuits to be initiated before the received signal arrives. This has not been a problem where long transmission lines have generally been used to connect equipment inside the Laboratory with an outdoor antenna probe and where an oscilloscope with a low level trigger input was used. Where the various components are physically close, however, it is necessary to include a delay line in the pulse path to allow sufficient time for the display circuits to trigger. The sampling circuit used in the prototype also requires a trigger signal of at least 15 volts and must be sustained as long as any significant information is being received. To provide this requirement, a special pulse former 64 had to be designed which would provide the necessary signal from the pulse generator output. The circuit makes use of the residual DC level present on the pulse generator output after the pulse but before the gas tube ceases to conduct.

Figure 13:
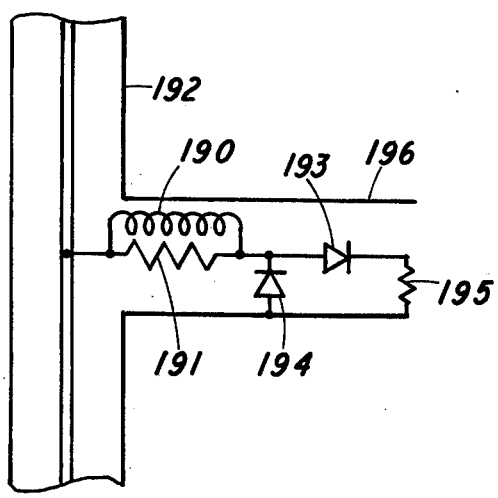
FIG. 13 is a schematic diagram of a trigger pick-off circuit which is connected to the output of a gas breakdown type pulse generator to provide a sustained trigger signal.

The pulse former circuit 64 is illustrated in FIG. 13 and includes a choke connected parallel to a 2000 ohm resistor which together are connected at their input to the transmission line 192 which extends from the pulse generator output to the transmitting arms of the antenna. A series diode 193 and shunt diode 194 connect the choke 190 and resistor 191 to the sampler input which is terminated in a 10 ohm resistor 195.

The residual DC level is connected via the choke 190 in the pick-off circuit to provide the sustaining voltage for the sampler trigger. The initial fast rise for the trigger is obtained by tapping off a small part of the transmitted pulse through the 2000 ohm resistor 191 in parallel with the choke 190. Diodes 193 and 194 prevent any premature shut off which might result from a negative reflected pulse arriving back at the source point. The short length of cable 196 between the diode 193 and the terminating resistor 195 provides a capacitance distributed along its length. This capacitance and the load resistance form an RC filter to further smooth the sustaining voltage.

III. THE ANTENNA

1. Transmit-receive sensitivity

The buried pipe should not return less than 70 dB less than the incoming signal amplitudes to the pipe.

2. Dispersion performance

Distortion of the pulse and in particular stretching the pulse duration is undesirable.

3. Transmit-receive isolation

The coupled signal must be limited in both amplitude and time so that the pipe return echoes are not obscured.

4. Radiation pattern performance

The pattern should be uniform and is primarily important in determining the location of the buried object.

5. Polarization performance

Polarization properties of the transmit and receive parts of the antenna that would permit the pipe direction to be determined were desired.

6. Antenna impedance matching

Impedance mismatches at the antenna terminals or on the antenna structure result in pulse reflections which decrease effective sensitivity, and can cause "clutter" in the return signal which obscures actual buried target echoes.

7. Physical features

A structure of manageable size and weight for a single operator is necessary.

8. Feed region geometry

Accurate orthogonality of the transmitting and receiving element feeds and a large distance to the antenna balun transformer from the feed region were found to significantly decrease coupling for all of the test antennas.

Figure 2:
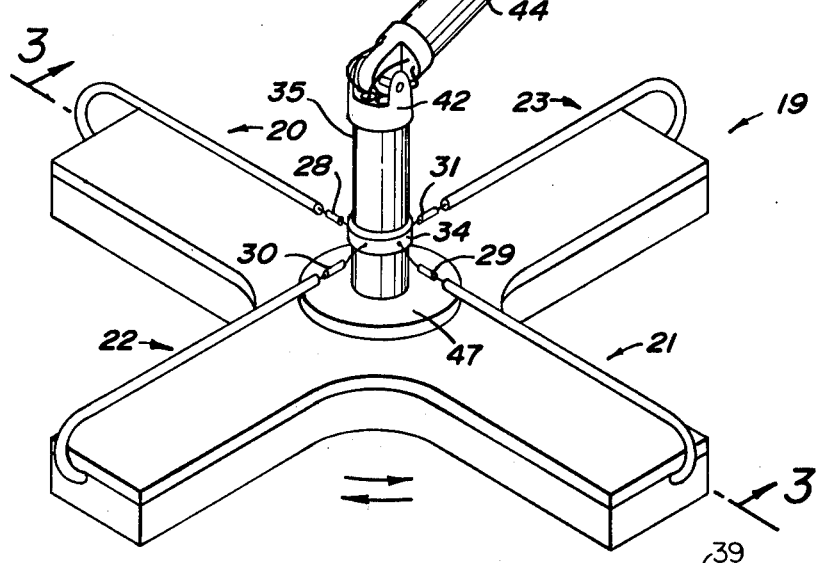
FIG. 2 is a perspective view of the antenna used in this invention.
Figure 3:
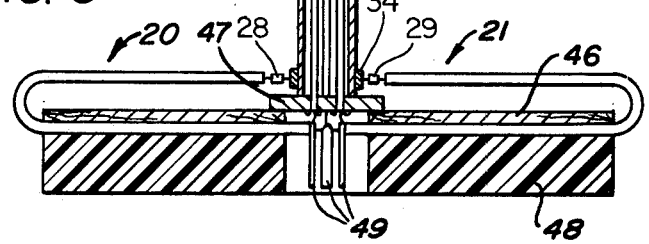
FIG. 3 is a section 3—3 taken through FIG. 2.
Figure 3A:
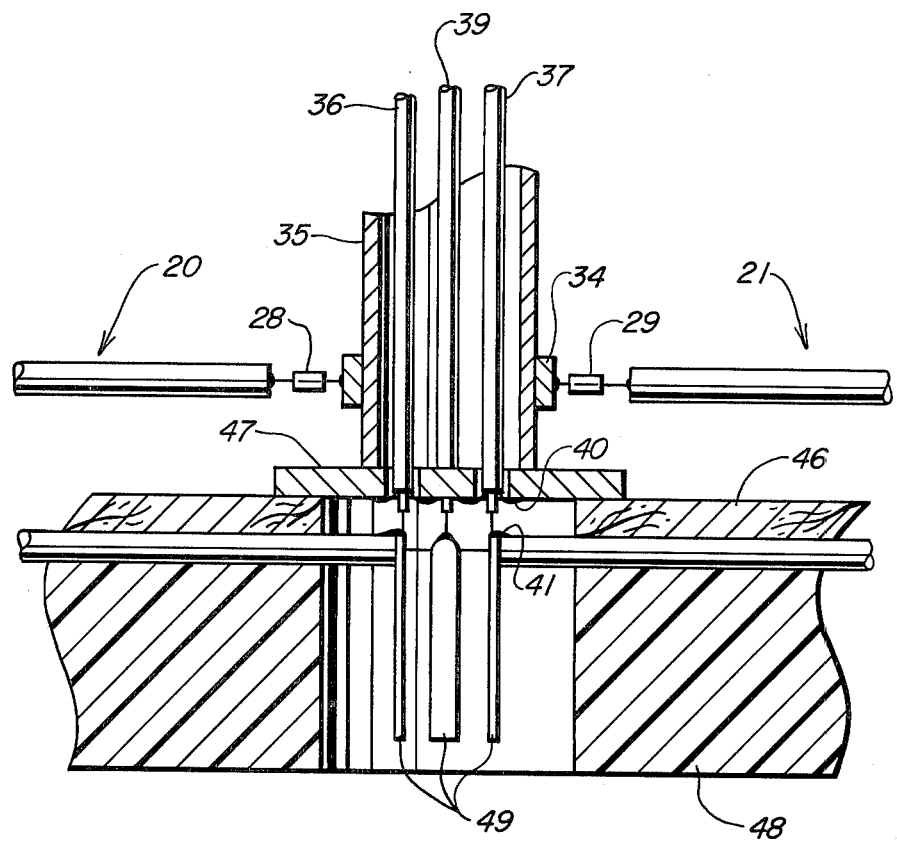
FIG. 3A is an enlarged partial view of FIG. 3.

As illustrated in FIGS. 2, 3, and 3A means for transmitting and receiving signals 19 generally include a first set of arms 20 and 21 which are used to transmit the signals and a second set of arms 22 and 23 which are used to receive the reflected signals. The first set of arms being substantially perpendicular to the second set of arms.

The U-shaped arms are formed of ⅜ in. diameter copper tubing and each of them have one of their ends connected to resistors 28, 29, 30 and 31 of about 190 ohms. The other end of each resistor is connected to a central hub 34. The lower ends of arms 20, 21, 22 and 23 are connected to respective insulated coaxial cables 36, 37, 38 and 39 which are also insulated from one another and which pass up through the tubes 35 and 44. A universal joint 42 attached to a handle 44 permits easy adjustment of handle 44 relative to the arms.

A dielectric material 46, e.g. plywood, separates the legs of each U-shaped arm and is held in place by a collar 47. An absorber 48 which may be Hairflex is operatively attached to the underside of the antenna and surrounds trim tabs 49. The sensitivity of this antenna probe is chiefly dependent on its length. A curve showing relative sensitivity vs length of the antenna (length of the conductor which is against the ground) is shown in FIG. 5. The 4 ft. length of the final version was found to give adequate signal-to-clutter ratio for the pipe targets to be measured. As is revealed more clearly in FIG. 3A, the inwardly disposed conductive lines within coaxial cables 36–39 are electrically attached to the lower ends of respective arms 20–23, while the outer conductive sheaths of the cables pass through and are electrically connected to the bottom surface of collar 47. For example, note the connection of the outer sheath of cable 37 with collar 47 at 40 and the connection of the inner conductive line thereof with the lower end of arm 21 at 41. Accordingly, short duration pulse transmission is derived from the above-noted transmitting balun transformer and is directed simultaneously in opposed polar sense along cables 36 and 37 to respective arms 20 and 21. Note that the conductive sheaths of all cables 36–39 are commonly connected at collar 47. In similar fashion, the inwardly disposed conductive lines of receiving coaxial cables 38 and 39 are coupled to the lower segments of respective receiving arms 22 and 23, while their conductive sheaths are commonly connected at collar 47. As above, reception of a given signal is delivered in opposed polar sense through cables 38 and 39 for conventional delivery to a reception balun.

The dispersion performance of the probe has been controlled by the resistive loading and folding of the elements. A normal dipole element causes significant pulse dispersion. It appears to radiate one undistorted pulse from the center feed, followed by successive pulses emanating from the tips, and later feed region reflections. By folding the antenna, and putting load resistors at the "far" end, the tip radiation was largely eliminated. The bound energy on the element proceeds around the folded portion and is absorbed by the load resistors 28, 29, 30 and 31. The 2 in. thick Hairflex absorber 48 between the element and the ground surface provides distributed loading, as does the grass and ground itself. The absorber 48 was also found to keep the antenna performance more consistent when it was placed on a nearly lossless surface, such as a concrete sidewalk.

The transmit-receive isolation of this probe depends mainly on the orthogonality of the transmit and receive elements. Since perfect orthogonality could not be achieved at the feed terminals, small metal trim tabs 49 were added. These have been adjusted to give good isolation in the input terminal region. It was found that bumps in the ground surface, tufts of grass, etc. can also degrade isolation. The absorber 48 between the antenna and the ground helps to minimize these effects. Experimentation has determined that an absorber layer about 2 in. thick was the best compromise for minimizing ground clutter, while not degrading antenna sensitivity. Resistive loading also affects the coupling by damping out any coupled signal quickly. Thus, the residual coupling at the terminal region is brief enough that it does not mask the expected returns from buried pipes.

The radiation pattern and polarization performance of the probe array are dictated by its crossed-dipole nature. Each element radiates (or receives) energy with E field polarized parallel to the element wires. Thus, the pipe reflection is strongest when the pipe is oriented at a 45° angle with respect to the two elements. Pipe echo response is theoretically zero for a pipe located parallel to either element. This aspect of the antenna provides a highly advantageous operational characteristic. For instance, conventional underground detection systems actively respond to the interface surface of various strata as commonly exist beneath the ground surface. The instant invention is immune from interference from such discontinuities, inasmuch as no polarization of a radiated signal is created thereby. Further, pipe direction is readily ascertained by minor movement of the antenna. A plot of echo strength vs displacement from directly above a 3 ft. deep plastic pipe for a probe similar to the prototype is shown in FIG. 4. It is estimated that pipe location with better than plus or minus 6 in. in accuracy can be obtained. The above-ground radiation of the probe is negligible as long as it stays close to the ground. By maintaining the antenna in close proximity to the ground surface, the coupling of electromagnetic energy between antenna and terrain is enhanced. Effects of the operator, and any other above-ground, distributed target are not seen in the echo returns. FIG. 5 illustrates the importance of longer arm length to sensitivity. A 2 ft. length for each arm was found to be a good compromise between sensitivity and mobility.

The impedance of the transmit and receive elements of the probe antenna depends on the dielectric material 46 (plywood) to which they are mounted, the absorber, and the load resistors.

Figure 9:
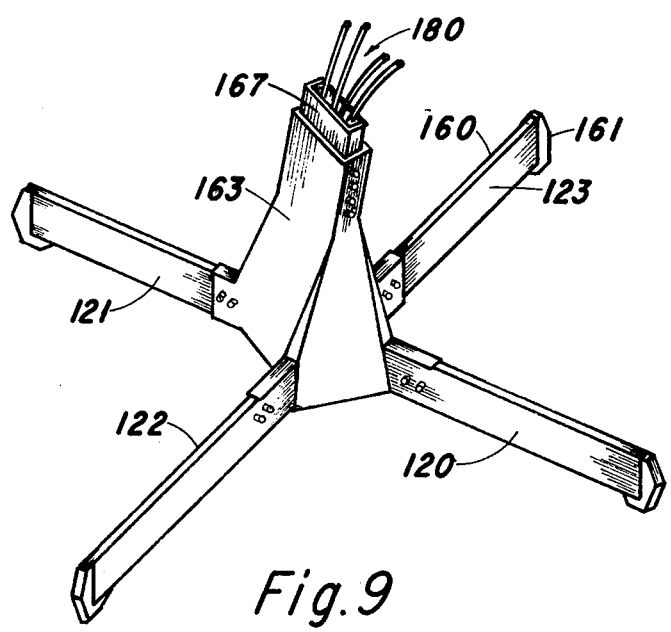
FIG. 9 is a view in perspective of an improved antenna for alternative replacement of the antenna illustrated in FIG. 2.

FIG. 9 illustrates an improved antenna which advantageously may be substituted for the antenna illustrated in FIG. 2. Like the antenna of FIG. 2, its purpose is the transmitting and receiving of broad spectrum electromagnetic radiation.

In the manner of antenna of FIG. 2, the antenna of FIG. 9 comprises a pair of oppositely extending transmitting arms 122 and 123 and a pair of oppositely extending receiving arms 120 and 121 which are arranged transversely to the transmitting arms. Also like the antenna of FIG. 2, each of the arms, such as arm 120 illustrated in FIG. 10, includes an outwardly extending, generally horizontal conductor portion 125 connected at its outer extremity 127 to a return loop conductor portion 129 which extends at a higher level than the horizontal portion 125 toward a central node 131. Each arm also includes a resistance connecting the interior end of the return loop portion to the central node 131. For example, the resistance 133 connects the interior end 135 of the return loop portion 129 to the central node 131.

The antenna of FIG. 9 has a layer of a non-resonant, lossy, dielectric absorber surrounding the horizontal portion and the return loop portion of each of the arms. Instead of using an absorber layer which comprises a horizontally oriented sheet extending below the arms such as was used in the antenna of FIG. 2, the improved antenna of FIG. 9 utilizes an absorber layer for each arm which comprises a vertically oriented sheet extending between and around the horizontal portion and the return loop portion of each of the arms. For example, absorber 137 extends between and around the horizontal portion 125 and the return loop portion 129 of arm 120.

The preferred absorber material is a carbon loaded flexible dielectric. The carbon loaded absorber is preferred because resonance conditions which can occur with absorbers using metallic particles are desirably avoided.

Preferably, the conductor portions are, like the conductor portions of the antenna of FIG. 2, formed of rods which are generally elongated, centrally opening U-shaped tubing, aligned substantially in a vertically oriented plane. The arms are orthogonally transverse and are geometrically and electrically symmetrical about the central vertical axis of the antenna.

Since the purpose of the absorber is to provide a non-resonant, resistive load, other structure for introducing loss might also be used. For example, instead of the lossy dielectric which is preferred, a magnetic loss could be introduced by providing a medium with an imaginary component of its permeability. Alternatively, the loss could be incorporated into the rod material forming the antenna arms. For this purpose the rod material might be formed of a highly resistive conductor such as nichrome or carbon. It is most important that loss be introduced into the horizontal portion of each arm since the desired electromagnetic radiation is created as the pulse travels along that portion. Most of the input energy is dissipated by the time the pulse reaches the return loop portion.

The antenna is further improved by the use of printed circuit boards at the upper and lower central region of the antenna at the intersection of its arms. The use of a printed circuit board provides more precise orthogonality and electrical symmetry and further increases the mechanical rigidity of the antenna which further stabilizes its electrical characteristics.

Figure 10A:
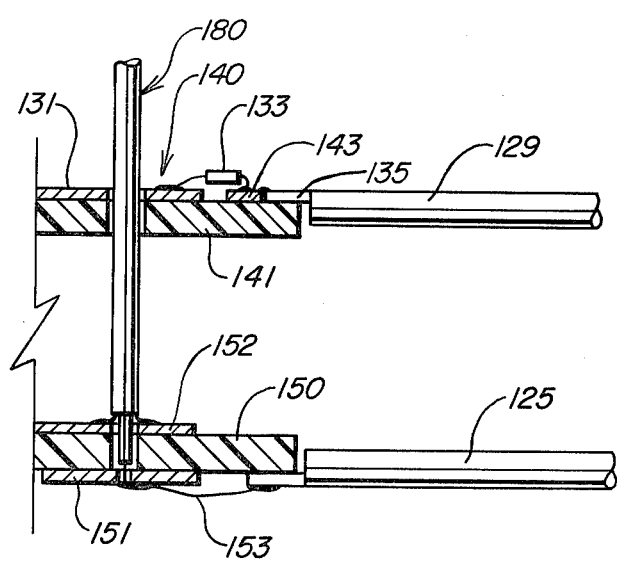
FIG. 10A is an enlarged partial view of FIG. 10.
Figure 10:
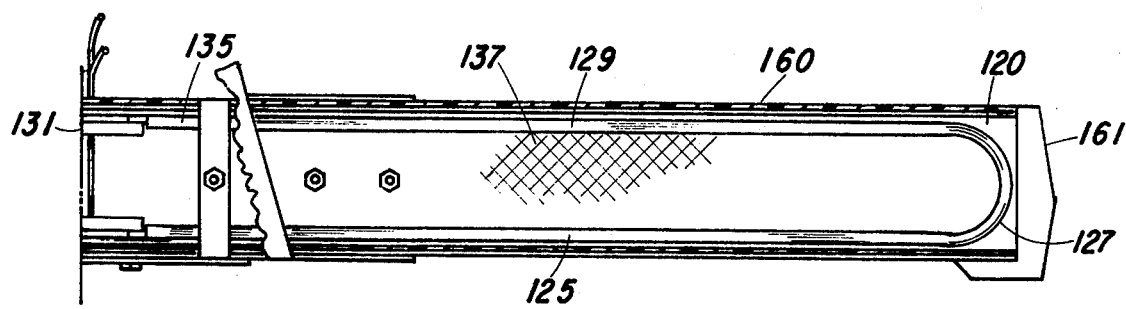
FIG. 10 is a view in side elevation illustrating an arm of the antenna of FIG. 9 with a portion of the covering protective envelope removed to reveal the interior structure.
Figure 11:
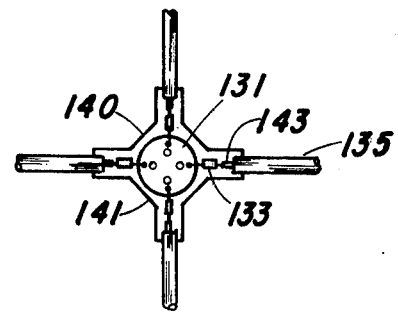
FIG. 11 is a top plan view of a central segment of the printed ciruit board and attached resistors mounted to the upper inner ends of the arms.

The upper printed circuit board 140 is illustrated in FIG. 10 and 11. Its mechanically rigid, non-conductive substrate 141 has the central node or central connection 131 and four orthogonally positioned electrical connection terminals, such as terminal 143, formed of conductive metal strips and adhered upon it. The central end of the return loop portion of each arm is mechanically anchored to the non-conductive substrate of the printed circuit board 140 and is electrically connected to a different one of the metallic terminals. For example, the central end 135 of the return loop portion 129 is electrically connected to the terminal 143. The resistances are then electrically connected in a mechanically rigid manner between the node 131 and the terminal for each arm. For example, the resistance 133 is connected between the node or central connection 131 and the terminal 143.

Figure 12:
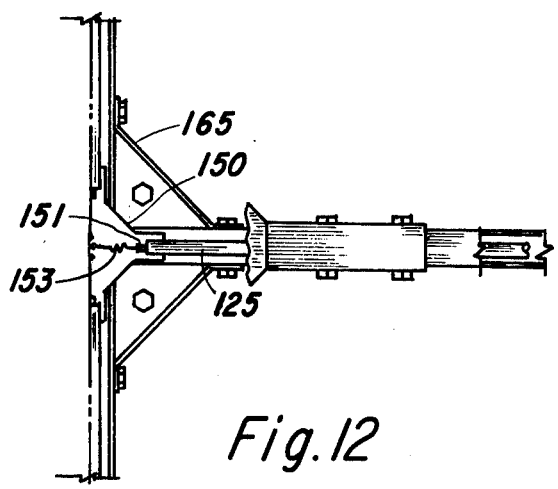
FIG. 12 is a view of a portion of the underside of the antenna of FIG. 9 and illustrating the printed circuit board mounted to its central underside.

Another printed circuit board 150 is provided for joining the central ends of the horizontal portions of each of the arms. FIGS. 10A and 12 shows the printed circuit board 150 to which the horizontal conductor portion of each arm, such as horizontal portion 125, is mechanically anchored. Four orthogonally and symmetrically arranged metal terminals are adhered on the nonconducting substrate and are electrically connected to the four associated horizontal portions of the arms. For example, terminal 151 is electrically connected to the horizontal portion 125 by means of a conducting wire 153. The four feed cables 180 are appropriately connected to the four terminals of the bottom circuit board 150 so that one pair of opposite arms transmit while the orthogonal, opposite arms receive electromagnetic radiation. As is revealed in FIG. 10A all of the conductive sheaths of cables as at 180 are mutually electrically coupled as by soldering or the like to a conductive metallic surface 152, while the inner conductive lines thereof are coupled electrically to discrete terminals as at 151 associated with each line. Surface 152 is formed as a conductive coating upon the non-conductive substrate of printed circuit board 150. As before, all conductive outer sheaths are commonly electrically connected at 152, while the return loop ends of all arms are commonly connected through resistors to central common connection 131.

Each of the arms, together with its associated absorber, is encased in a protective synthetic resin envelope 160, the outer ends of which are formed or molded with feet such as foot 161. Four braces, such as brace 165, made of a suitably dielectric material, extend between adjoining arms for improved strength and rigidity. A central synthetic resin housing extends over these braces and about the central portion of the antenna for protecting the printed circuit boards and other central circuit elements. The central post 167 may be provided with a universal joint such as the universal joint 42 which is illustrated in FIG. 2.

The improved antenna operates according to the same basic principles as did the antenna of FIG. 2. A pulse of high potential and short duration and having a fast rise time to produce very substantial high frequency radiation is applied to the central ends of the horizontal conducting portions of the opposite transmitting arms. As the pulse travels around the conductor portion of each arm, its energy is radiated and the pulse is very substantially damped by the absorber. Finally, when the pulse reaches the resistance of the arm, its remaining energy is dissipated by its associated resistance, thereby minimizing reflections of the pulse. The use of printed circuit boards permit more precisely controlled orthogonality to further minimize coupling between the transmitting and receiving arms. The printed circuit boards also help retain the arms in their orthogonal position so that they will not be physically moved, altering the electrical balance and characteristics of the antenna.

We have further found that the new absorber configuration illustrated in FIG. 9 and FIG. 10 distributes the loss more evenly and that the use of the plastic envelope provides a more rugged and durable antenna and makes the antenna waterproof, consequently, minimizing corrosion and preventing variations in electrical characteristics due to the presence of moisture in the absorber or elsewhere in the region of the antenna.

IV. SIGNAL PROCESSOR

Figure 6:
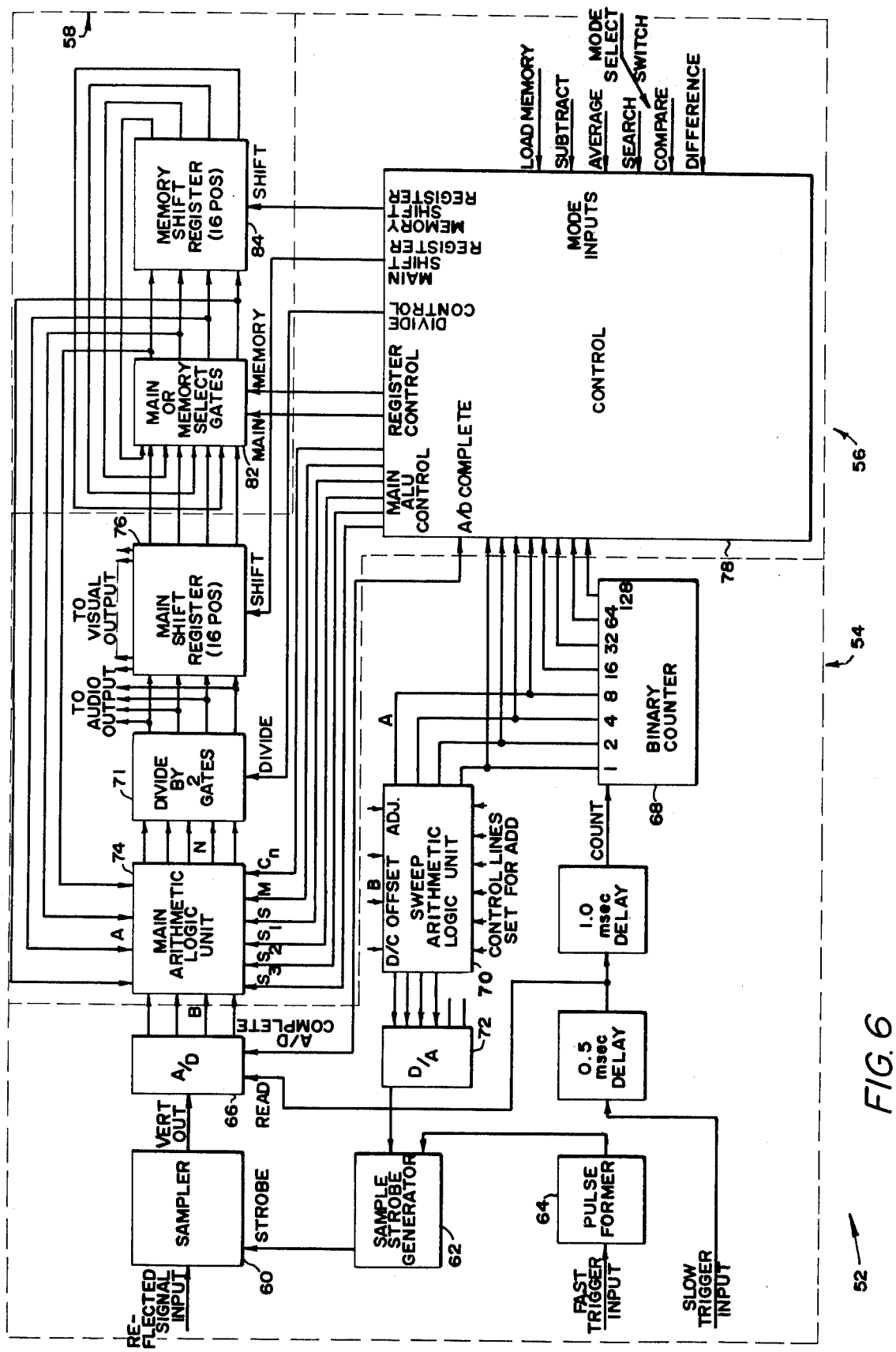
FIG. 6 is a schematic diagram of the processing equipment for the signals.

A signal processing system 52, shown in FIG. 6, receives the reflected signal from the antenna. For the purposes of description, the system 52 has been subdivided into the following three sections:

A. Means for converting 54 the reflected signal.
B. Means for operating 56 on the reflected signal.
C. Means for storing 58 the reflected signal.

A. MEANS FOR CONVERTING THE REFLECTED SIGNAL

Means for converting 54 the reflected signal includes that section shown in dashed lines in FIG. 6. Specifically, it is a function of this section to receive the reflected signal and convert it to a digital form in which it can be readily operated on and stored. It is this conversion to digital form which permits relatively portable equipment to operate on and store the signals. If the reflected signal were left in analog form, processing the signal with equipment which must be taken into the field to locate buried pipe would be virtually impossible.

The signal processor 52 is synchronized to the pulse generator 10 which operates at a rate of about 256 pulses per second. Two trigger signals drive the processor 52. A fast, high precision trigger, about 150 picoseconds long, is derived directly from the pulse generator. It is used to synchronize the sampler 60, where timing accuracies of about 1 nanosecond are required to sample properly the reflected signal or the "receive echo" information as it may be alternately called herein.

A slow trigger can be used in place of the fast trigger for the remainder of the signal processing. Once the waveform information has been sampled, it can be processed with much less timing precision during the approximately 4 millisecond (msec) time interval between successive pulses. The slow trigger is derived from a preamp stage of the pulse generator, and its arrival can vary about plus or minus 10 microseconds with respect to the output picosecond pulse. This one is used to drive the main processor counter, which in turn acts as a clock to control the processing of the binary information.

The entire system works on binary numbers. The processor works on 4-bit binary numbers (A) and, the range of A is:

$$A_{largest} = 1111_2 = 8 + 4 + 2 + 1 = 15_{decimal}$$

$$A_{smallest} = 0000 = 0_{decimal}$$

The binary counter is 9 bits, so it can count from $A = 000000000_2 = 0$ to $A = 111111111_2 = 255_{decimal}$ The means for converting 54 further includes a sampler 60 (Tektronix Model No.3S7), a sample strobe generator 62 (Tektronix Model No. 3T7), a pulse former 64, an A/D converter 66, a binary counter 68, a sweep arithmetic logic unit 70, and a digital-to-analog (D/A) converter 72, all of which are operatively, electrically interconnected to provide a timed digital binary pulse to the means for operating 56. The items that form the means for converting are commercially available and the detailed circuitry for them are known or available to one skilled in this art.

The sample strobe generator 62 produces a sample strobe at the correct instant for digitizing the echo waveform to produce a set of numbers corresponding to the columns of a light emitting diode digital waveform display which will be explained in more detail hereinafter. The pulse former 64 output provides the accurate synch to the output pulse required.

The magnitude of the input signal to the generator 62 from the D/A converter 72 tells that unit when to sample the signal.

The sample stroke generation process takes place once for each output pulse, or at 256 samples per second. Each time the processor sets up a different N to sample a different column of the digital waveform. Since the shift register contains 16 columns, the display of the waveform could be refreshed at a rate of $$\frac{256 \text{ samples per second}}{16 \text{ samples per waveform}}$$

or 16 new digitized waveform replicas per second.

The sampler 60 is a high-speed sample and hold circuit. The value of the waveform at any given time is stored and stays approximately constant until the next strobe. The A/D converter 66 thus has the time to convert this analog voltage value to a binary number. Further description of the sampler 60 and sample strobe generator 62 as they normally operate in an oscilloscope are provided in the Tektronix 3T7/3S7 Manual, the disclosure of which is herein included by reference.

The A/D converter 66 changes the voltage value out of the sampler 60 to a 4-bit binary number. Its strobe is derived from the slow trigger with a 0.5 msec delay.

Thus, the digitization begins about 0.5 msec after the sample-and-hold operation, and is completed within 1 msec after that.

The three items that make up the binary counter section are the binary counter 68, sweep arithmetic logic unit 70 and the D/A converter 72. The three items are also included in the means for converting 54.

Processing the echoes or reflected signals consists of a series of events in a timed sequence. The specific events depend on the function selected, but all functions are repetitive, with a cycle time of approximately 1 second. The event sequence timing, and the information on which column of the display is to be converted and processed, are derived from the binary counter section.

The binary counter 68 has a strobe input and eight outputs, the states of which can define an 8-bit binary number. Every time the counter is strobed, the outputs change to increase the binary number by 1. The number $N_{out}$ has a range from:

00000000 = Decimal 0 to

11111111 = Decimal 255

After it reaches $255_{10}$, the next strobe resets the count to zero, and succeeding strobes cause it to count up all over again. The strobe comes from the pulse generator "slow trigger" signal with a 1.5 msec delay. Thus, the strobe has a rate of about 256 pulses per second, and the complete counter cycle takes about 1 second.

The visual display contains 12 columns of light emitting diode lamps (FIG. 8), each column corresponding to a time sample of the input echo waveform. A new value for one of these columns can be read from each return echo. The signal which determines which column (portion of the return echo waveform) is to be converted from an A/D signal is derived directly from the binary counter 68, and goes to the sample strobe generator 62.

Bits 1, 2, 4 and 8 are complemented and fed to input A of the sweep arithmetic logic unit 70. The control inputs of the arithmetic logic unit are permanently wired so that the arithmetic logic unit output equals the sum of the 4-bit binary numbers at arithmetic logic units inputs A and B. Therefore, wiring connections to input B could add an offset number to the counter number, for purposes of adapting this signal to the specific voltage requirements of the sample strobe generator. For our unit, using a 3T7, the required value for B is zero. Thus, the arithmetic logic unit would not be required as long as the 3T7 is used.

The 4-bit binary output of the arithmetic logic unit is converted to an analog signal by the D/A converter 72. Sampling of the most delayed waveform portion is done first in the cycle. Also, the complete 16 column shift register could be refreshed at a rate of 16 times per second in this processor.

B. MEANS FOR OPERATING ON THE REFLECTED SIGNAL

The means for operating 56 includes a main arithmetic logic unit 74, divide by two gates 71, a main shift register 76 and control 78, all of which are operatively, electrically connected.

There are two basic inputs to this section. First, binary numbers from the A/D converter provide two-domain echo sample data. Second, a set of signals from the process control section determine the algebraic processing to be done to the binary sample numbers.

Figure 8:
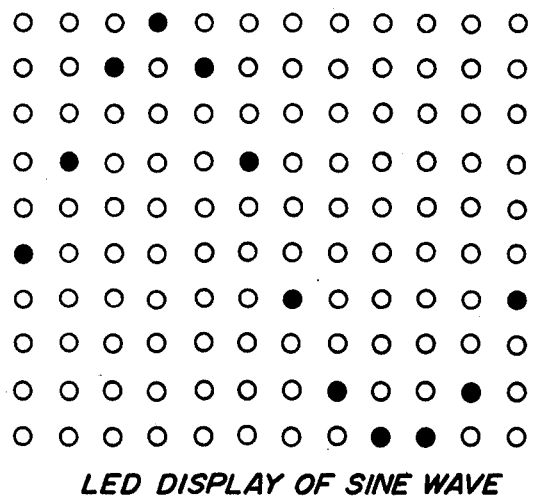
FIG. 8 is a representation of the light emitting diodes used in the visual display.

The output of this section is the light emitting diode visual waveform display of the information which is shown in FIG. 8. The system acts as an augmented sampling oscilloscope with a discrete display to present return time-domain waveforms as the sensing probe is swept over the ground. The display is a 10 × 12 array of light emitting diodes which present a replica of a waveform that might ordinarily be seen on an oscilloscope tube. For example, a sine wave would appear on the light emitting diode array as shown in FIG. 8.

The main shift register 76 stores 16 four-bit binary numbers, the first 12 of which correspond to columns on the waveform light emitting diode display.

Digital signals enter the left end of the main shift register. The right most column number of the register 76 is available for output. When a shift strobe signal is sent to the main shift register 76, each binary number is moved one column right. The new binary number fills column 1 (left-most) and the old binary number in column 16 (right-most) is lost.

In normal operation, the main shift register 76 is given 16 rapid shift strobes to load binary numbers for a complete new waveform. The shift strobes are then turned off to let the new information rest in place. The display of the information, thus, stabilizes and the picture can be read and interpreted by the operator.

Each of the 16 binary numbers going into the left end of the main shift register 76 may be the A/D converter output (one of 16 waveform samples) of the A/D output modified by the main arithmetic logic unit and the divide gates to be described below. Each of the 16 numbers gets processed in the same manner for a given processing mode. So, in a sense, the whole input waveform gets modified as it is shifted into the register.

To refresh the main shift register 76, the binary number which will eventually rest in column 16 (i.e., most delayed waveform sample) gets put into the left end of the shift register first. As succeeding columns are put in, this number shifts through columns 1–15 until it eventually rests in column 16.

The main arithmetic logic unit 74 plays an important function in this invention. As each A/D binary waveform sample number is loaded into the main shift register 76, it can be modified by the main arithmetic logic unit 74. The main arithmetic logic unit 74 has an A and B input for a pair of 4-bit binary numbers, a set of control inputs to determine the arithmetic to be done by the arithmetic logic unit, and a 5-bit output, N. Depending on the control settings, N equals A + B or A − B, or A, or B, or BA, etc.

In the main arithmetic logic unit 74, the A/D output is connected to the B input of the arithmetic logic unit, and the A input is connected to the output of the memory/main select gates (described below). Effectively, the A input is connected to column 16 in either the main shift register or memory shift register. N is connected to the divide gates.

The divide by two gates 71 may aid in processing the binary numbers from the arithmetic logic unit 74. The divide by two gates are really a shift right register which can make the input to the main shift register N or N/2 depending on a control signal.

The control 78 runs the binary number manipulation and display section. It includes a six-position mode switch, and a set of logic NAND/NOR circuits, a set of mode selection flip-flops (not shown). The inputs are:
1. Mode selection
2. Binary counter signals
3. The A/D conversion complete signal Outputs of the control section 78 are:
1. Main arithmetic logic unit control signals
2. Divide gates control signals
3. Main shift register shift strobe
4. Main or memory select gates control signal
5. Memory shift register shift strobe The mode selection flip-flops act as a buffer between the mode switch and the logic circuitry. They eliminate switching transients; they assure that only one mode is selected at a time; and, in case the switch position is changed, they prevent mode changes until the start of a new 256-count clock cycle.

There are six modes:
Search
Average
Load Memory
Subtract
Compare
Difference

Summaries of the functions of these six modes may be helpful. In the following mode summaries, use is made of data stored in the memory which is described below:

1. SEARCH

The main shift register 76 is updated every half second with new data; old main data is dumped; the memory data is unchanged. This mode approximates normal scope operation. It would probably be used in adjusting the plug-in controls to get a picture on the display. Under ideal conditions, this mode may be used to locate pipes.

2. AVERAGE

The main shift register is updated every half second with one-half the sum of the new data and the old main register data; the memory waveform is unchanged. It was found that the rough ground surface clutter which sometimes obscures buried pipe returns is random, and uncorrelated if the probe is moved more than 6 in. between trials. The pipe return, on the other hand, stays about constant over a 6 in. interval if the probe is directly overhead. Thus, if the probe is slowly swept over the rough ground, the average mode improves the signal-to-clutter ratio.

3. LOAD MEMORY

The main shift register is updated every half second with the average of new data and old main data, as in the average mode. In addition, the old main data is transferred into the memory. Thus, when the switch is moved from this position, an average waveform has been stored in memory. This might be an average no-target return or a known pipe return for future reference.

4. SUBTRACT

The main data is updated every half second with the difference between the new data and the memory data. Old main data is dumped and memory data remain unchanged. If no-target ground clutter data were stored in memory, for instance, then target minus no-target would be displayed.

5. COMPARE

The main register gets alternative half-cycle displays in this position. The memory data is displayed on the first half cycle, and the new data is displayed on the second half cycle. Alternate display of return and reference assists target identification in some situations.

6. DIFFERENCE

The main shift register is updated every half second with the difference between the new data and the old main data; the memory remains unchanged. For a constant return waveform, this position causes a straight line display. Any change in the return data is easily sensed in this switch position.

C. MEANS FOR STORING THE REFLECTED SIGNAL

Electrically interacting with control 78 to perform the various functions is the means for storing 58 the reflected signal or echo which includes main or memory select gates 82 and a memory shift register 84 electrically connected thereto.

The memory shift register 84 is a 4-bit, 16 column left-to-right shift register just like the main shift register 76. Its left column input is a binary number from the main/memory select gates 82. Its right column (column 16) output goes to the input of the main/memory select gates. A shift strobe input from the process controller causes this register to shift right one column.

The main or memory select gates 82 have two binary inputs; the number in the last (right-most) column of the main shift register, and the same for the memory shift register. Their outputs are connected to the input of the memory shift register, and also to the A input to the main arithmetic logic unit. A control signal input determines whether the main or memory shift register's last column is gated on.

V. FUNCTIONAL SUMMARY OF THE SIGNAL PROCESSOR

1. The sample strobe generator 62 receives an input strobe coupled off of the 1 Kv output pulse by the pulse former network. It also receives a 0 to 10 v level from the D/A converter 72 indicating which position on the display is to be sensed. Following the correct delay interval, this unit sends a strobe to the sampler 60.

2. The sampler 60 samples the signal input at the time instant when it receives a strobe. Its output (0–10 v) is fed to the A/D converter 66.

3. The A/D converter 66 encodes the sampler voltage into straight binary. This is an 8-bit converter, but only 4 bits are presently used. The read strobe is derived originally from a 3 v, slow rise-time pulse coming out of a rear connector of the pulse former 64 which is delayed ½ msec to allow the sampler to finish. At the completion of A/D encoding, an A/D complete signal is sent to the control section.

4. The main arithmetic logic unit 74 is a 4-bit arithmetic function generator with a B input from the A/D converter 66 and an A input coming from the main or memory shift register. Depending upon the state of the input control bits, its output can be A + B, A only, B only, A−B, 2A or many other functions not presently used. Its 5-bit output (4 bits + carry) is fed to the divide by two gates.

5. The divide by two gates are switches which connect four of the five outputs to the 4 inputs of the main shift register. To divide by two, the carry and three most significant bits are connected to the inputs; otherwise the four normal arithmetic logic unit output bits are connected. A divide control signal sets the state of the divide gates.

Audio output lines are shown at the input to the main shift register. These lines are not normally used because experiments in identifying buried pipes by sound seemed to depend greatly on personal preference. The light emitting diode array seems to be a superior technique. Should an audio output be desired, a D/A module and an audio preamp I.C. driving earphones could be added.

6. The main shift register is a 4 bit, 16 position register, with a common shift input that moves information from left to right. A 4-bit input decimal decoder and light emitting diode driver is connected to each of the left-most 12 columns. One out of ten light emitting diodes is lit for values 0-9 and no light emitting diodes are lit for values of 10-15 in each shift register position. Note that to get a valid waveform display, the last (most delayed) time-domain sample gets put into the shift register first, and then gets shifted to the right end as the other samples are put in.

7. The output of the main shift register and the memory shift register are inputs to the main or memory select gates. Depending on the state of the input control signals, the 4-bit last column data from one of these registers is made available at the A input of the main arithmetic logic unit and the left input of the memory shift register.

8. The memory shift register 84 operates in the same manner as the main register 74. No light emitting diode decoder drivers are used on the memory register, however.

9. The binary counter 68 controls the time sequencing of the system. It is synchronized to the 250 Hz slow trigger input pulse, with a total delay of 1.5 msec to allow for sampling and A/D conversion before the counter state changes. The 8-bit counter goes through one complete cycle (0-255) in about 1 second. The lower-order 4 bits are connected to the D/A converter through the sweep arithmetic logic unit which allows the insertion of a digital DC offset. Thus, the D/A converter 72 generates a 0-10 v staircase ramp at about 16 Hz rate to the 3T7 time base unit. All eight counter bits are fed to the control section.

10. The control 78 has inputs from the six position mode control switch, from the A/D converter 66, and from the binary counter 68. This circuit puts out pulses or voltage levels to the main arithmetic logic unit 74, the divide by two gates 71, both shift registers, and the main or memory select gates 82 to control the data flow and the light emitting diode display. In all modes, the total 1 second cycle is divided into two half cycles, which may or may not perform different functions. Information is shifted through the registers during the first and eighth of the 16 staircase ramp cycles, and rests in the register to provide a constant display during the other time portions.

The control unit is implemented in combinatorial NAND/NOR logic, beginning with a set of mode-holding flip-flops connected to the mode switch.

Figure 7:
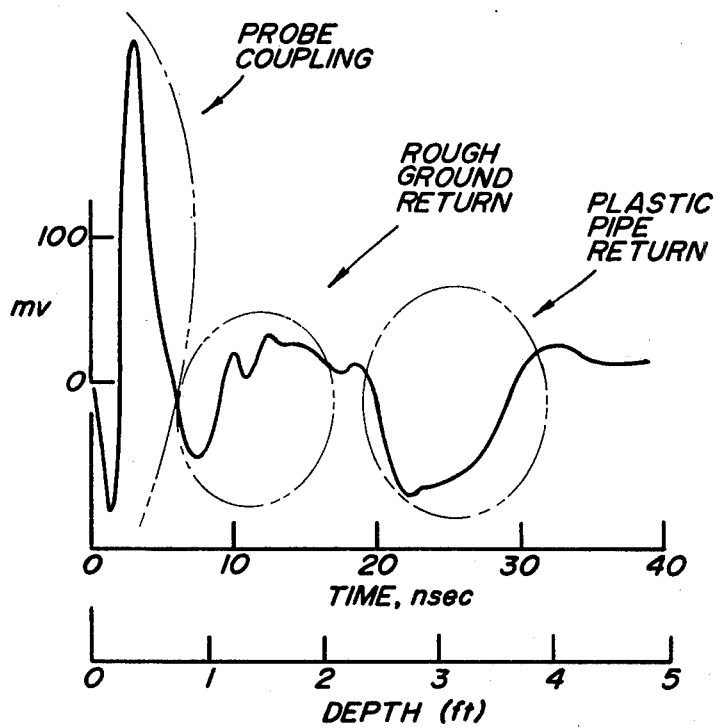
FIG. 7 is a representation of a typical waveform.

11. The most convenient receiver for the broad spectrum echoes sensed by the probe is a sampling oscilloscope. Using synchronized time-domain sampling of a train of identical return echoes, such an instrument can display a replica of the time-domain received signal for observation of further processing. A typical time-domain received waveform is shown in FIG. 7. Several waveform features are circled. The first sharp impulsive waveform portion is due to direct coupling between the transmit and receive portion of the probe. Perfect transmit-receive isolation has never been obtained. This feature, however, is used as a time reference for target depth determination, since it occurs at the time the impulse is radiated. During the next few nanoseconds, a randomly varying return due to ground surface irregularities directly beneath the probe occurs. For good probe designs, this feature dies out in less than 10 nanoseconds. Finally, the return from a buried plastic pipe is seen in this waveform. Note that the propagation velocity has been used to obtain a second horizontal scale indicating target depth in this figure. The pipe is about 30 in. deep.

Changes in the circuitry, the display means and the other components will be obvious to one skilled in the art, and should be considered a part of this invention.

What is claimed is:

1. An antenna for transmitting and receiving broad spectrum electromagnetic radiation said antenna comprising a pair of oppositely extending non-resonant, distributively, resistively loaded transmitting arms and a pair of oppositely extending non-resonant, distributively, resistively loaded receiving arms arranged transversely to said transmitting arms, each of said arms comprising an outwardly extending generally horizontal portion connected at its outer extremity to a return loop portion extending at a higher level than the horizontal portion toward a central common connection and a resistance connecting the interior end of the return loop portion to the said central common connection.

2. An antenna according to claim 1 wherein a layer of a non-resonant, lossy, dielectric absorber surrounds at least a portion of said horizontal portion.

3. An antenna according to claim 2 wherein said absorber layer comprises a horizontally oriented sheet extending below said arms.

4. An antenna according to claim 2 wherein said absorber surrounds both said horizontal portion and said return loop portion.

5. An antenna according to claim 4 wherein said absorber layer comprises a different, vertically oriented sheet extending between and around the horizontal portion of the return loop portion of each of said arms.

6. An antenna according to claim 1 wherein said arms each comprise a rod formed of a resistive conductor.

7. An antenna according to claim 1 wherein said pairs of arms are orthogonally transverse and the arms of each pair are geometrically and electrically symmetrical about a central axis.

8. An antenna according to claim 7 wherein each of said arms has a generally elongated, centrally-opening U-shape in a substantially vertically oriented plane.

9. An antenna according to claim 8 wherein said central common connection and the resistances of the arms comprise a first printed circuit board having said common connection formed thereon, said resistances and electrical connection terminals being orthogonally and symmetrically arranged thereon and wherein the central ends of the horizontal portions of each of said arms are connected to a different one of four terminals which are orthogonally and symmetrically arranged on a second printed circuit board.

10. An antenna according to claim 7 wherein said horizontal and said return loop portions are conductive rods and a layer of a non-resonant, lossy, dielectric absorber surrounds at least a portion of said horizontal portion.

11. An antenna according to claim 10 wherein said absorber layer comprises a different, vertically oriented sheet extending between and the around the horizontal portion and the return loop portion of each of said arms.

12. An antenna according to claim 11 wherein each of said arms and its associated absorber layer are encased in a protective synthetic resin envelope.

13. An antenna according to claim 12 wherein said antenna is mechanically mounted to an upwardly extending post having a universal joint.

14. An antenna according to claim 1 wherein a layer of non-resonant, lossy, magnetic absorbing material surrounds at least a portion of said horizontal portion.

* * * * *